United States Patent [19]

Yuhas et al.

[11] 4,092,090
[45] May 30, 1978

[54] TIRE CURING SYSTEM

[75] Inventors: Gerald Joseph Yuhas, Canfield; Leonard G. Turk, Aurora, both of Ohio

[73] Assignee: NRM Corporation, Akron, Ohio

[21] Appl. No.: 797,938

[22] Filed: May 18, 1977

[51] Int. Cl.$^2$ .................. B29H 5/02; B29H 17/00; B29H 21/00
[52] U.S. Cl. .................................. 425/28 P; 425/445
[58] Field of Search ............... 425/28 P, 32, 33, 38, 425/44

[56] References Cited

U.S. PATENT DOCUMENTS

| | | | |
|---|---|---|---|
| 3,065,499 | 11/1962 | Brundage | 425/32 |
| 3,075,237 | 1/1963 | Soderquist | 425/44 |
| 3,214,790 | 11/1965 | Wright et al. | 425/44 X |
| 3,214,791 | 11/1965 | Ericson et al. | 425/44 X |
| 3,343,208 | 9/1967 | Pacciarini et al. | 425/38 |
| 3,530,533 | 9/1970 | Turk et al. | 425/32 |
| 3,605,182 | 9/1971 | Ulm | 425/28 P |
| 3,640,653 | 2/1972 | Laenen et al. | 425/33 |
| 4,025,251 | 5/1977 | Cantarutti | 425/38 X |

*Primary Examiner*—J. Howard Flint, Jr.
*Attorney, Agent, or Firm*—Maky, Renner, Otto & Boisselle

[57] ABSTRACT

A curing system including a curing press-post inflator combination wherein the tire moves through the curing and post inflation process under complete control at all times. The post inflator is mounted on the press frame and is aligned with the top mold section of the press in the full open position of the press. The upper or outside bead rim of the post inflator is removed by a mechanism operating, in part, independently of the press top mold section so that the post inflator can be closed and operational prior to the full closing of the press. A chuck in the top mold section not only holds the tire for stripping from the mold sections and bladder but retains control over the tire vertically to place the tire without dropping or any lateral movement on the aligned open bottom or inner bead rim of the post cure inflator.

29 Claims, 25 Drawing Figures

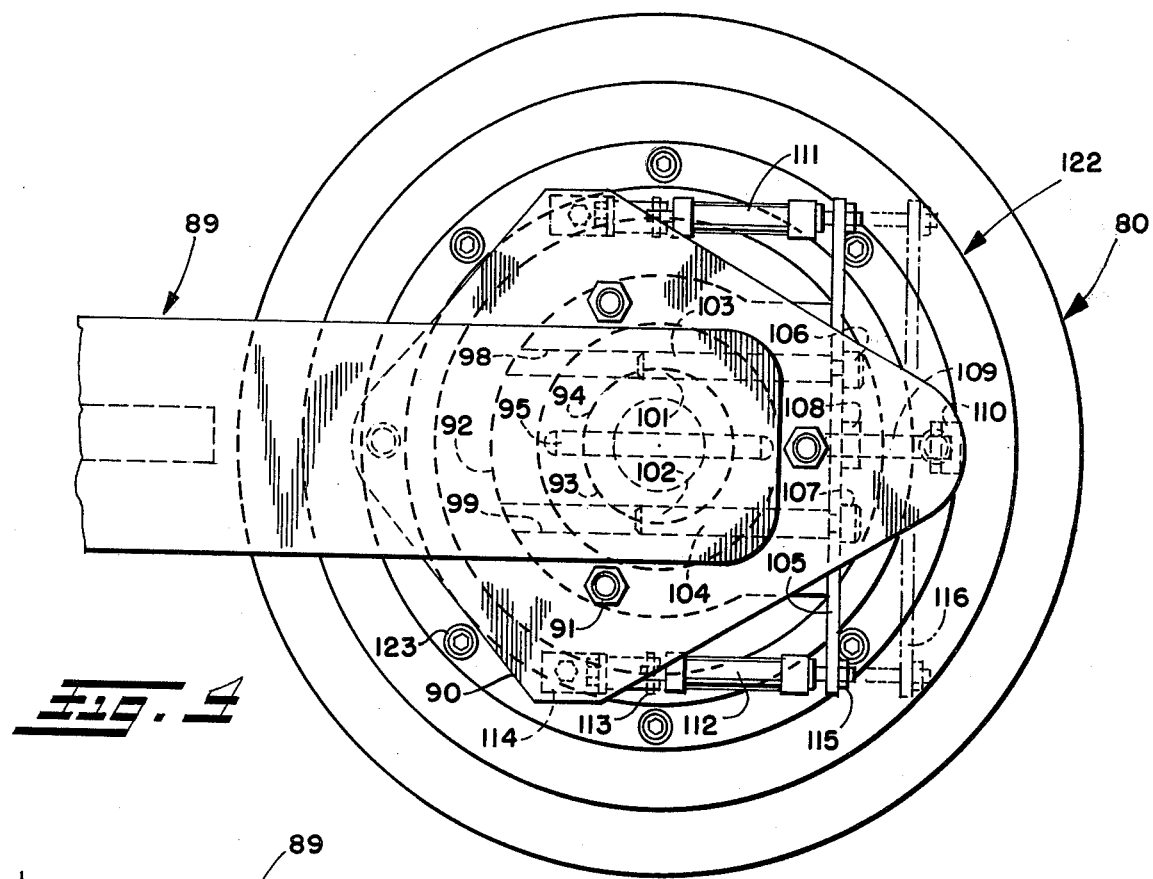
_Fig. 2_
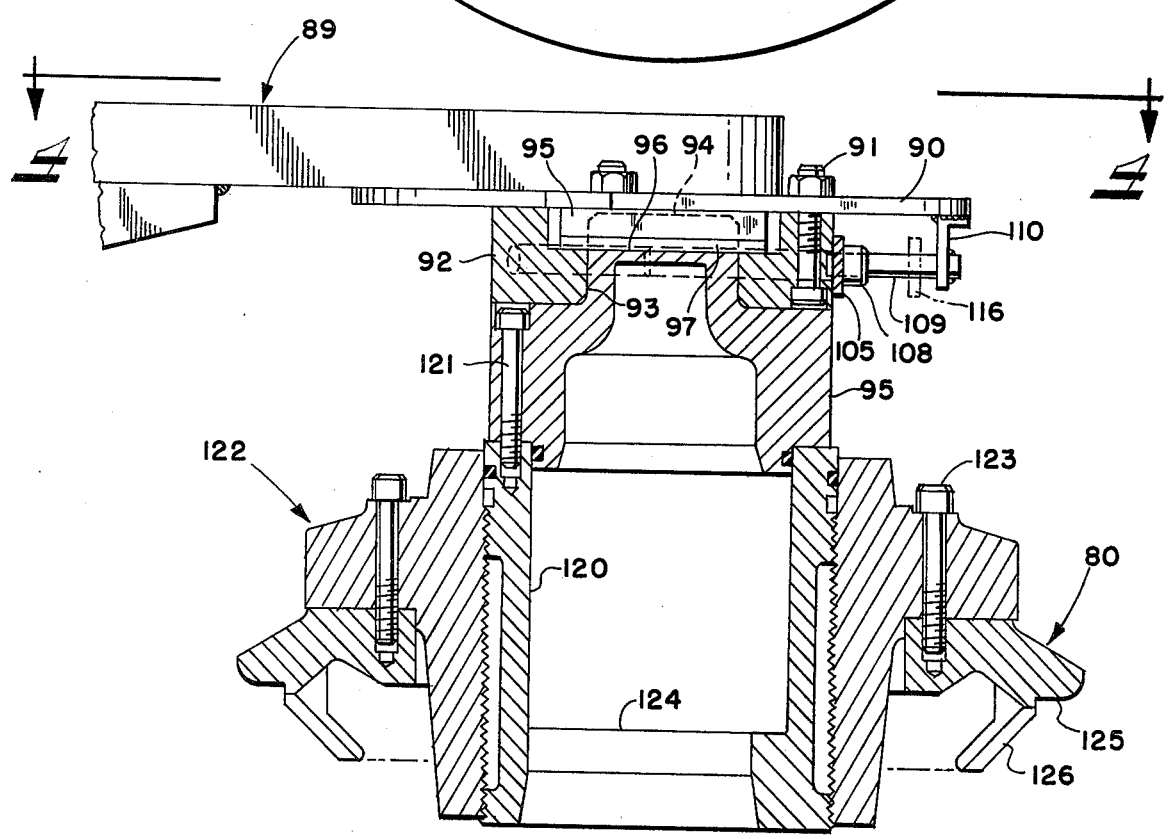
_Fig. 3_

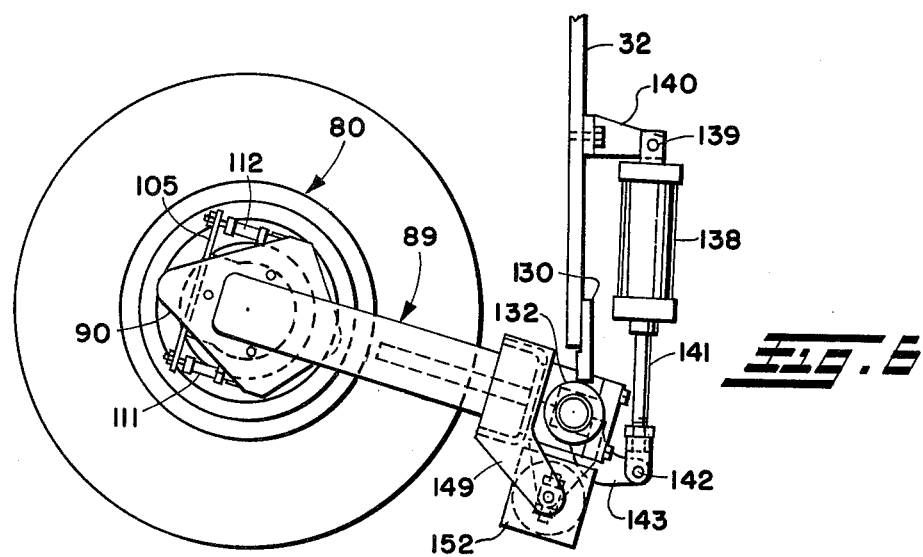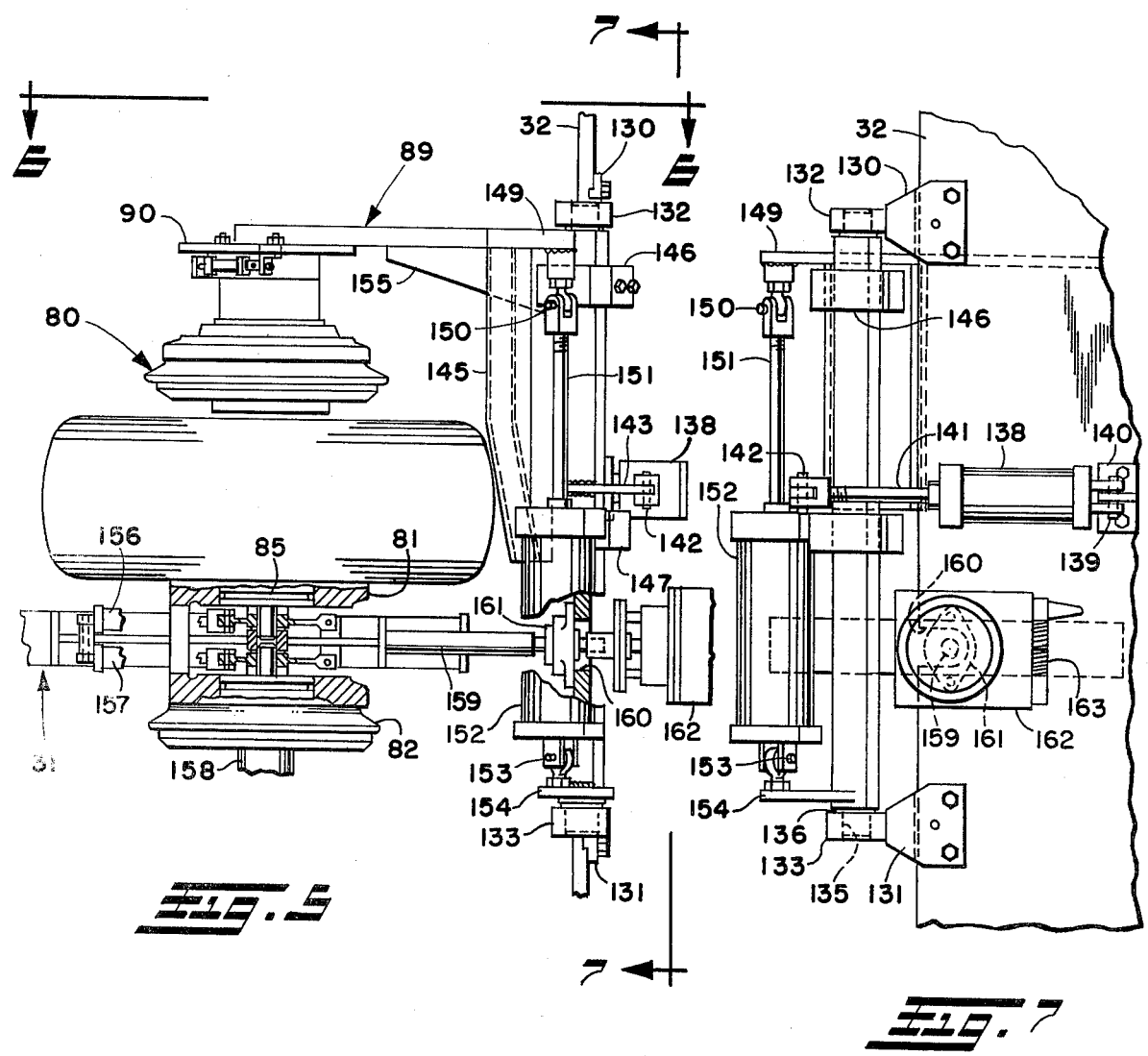

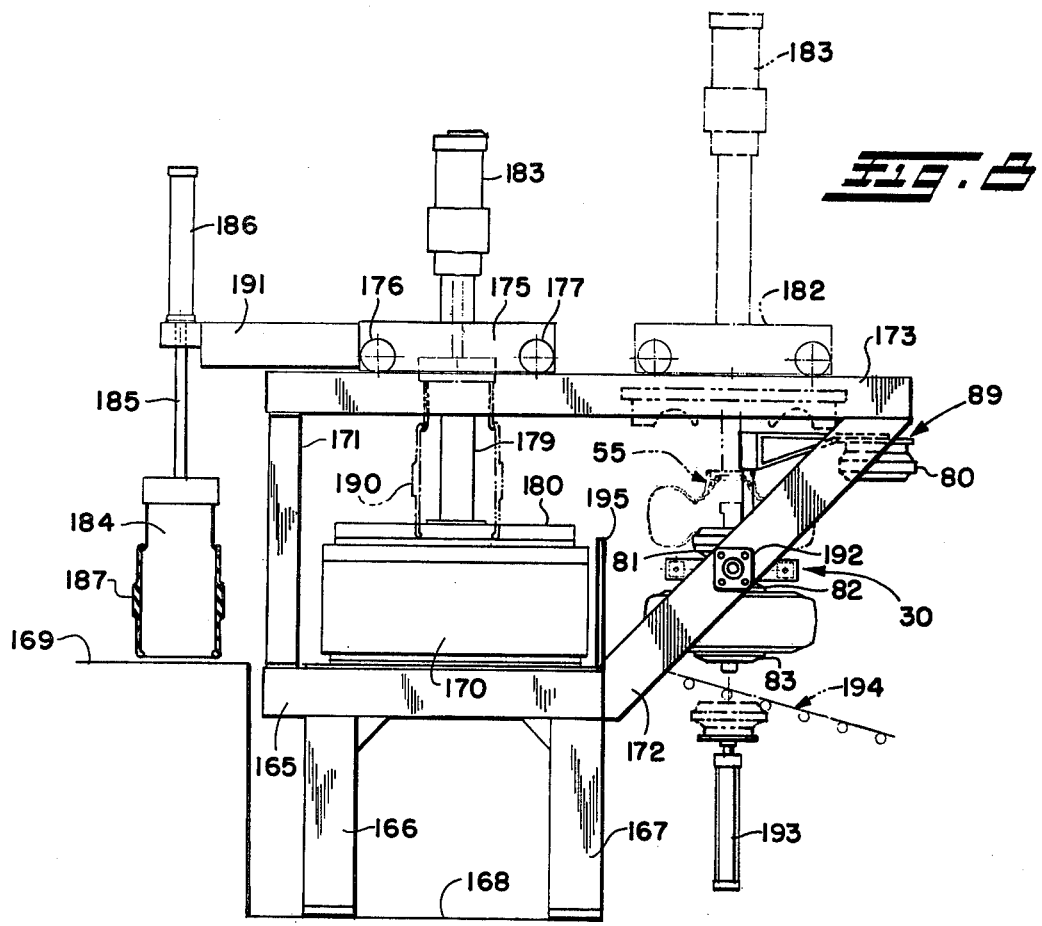
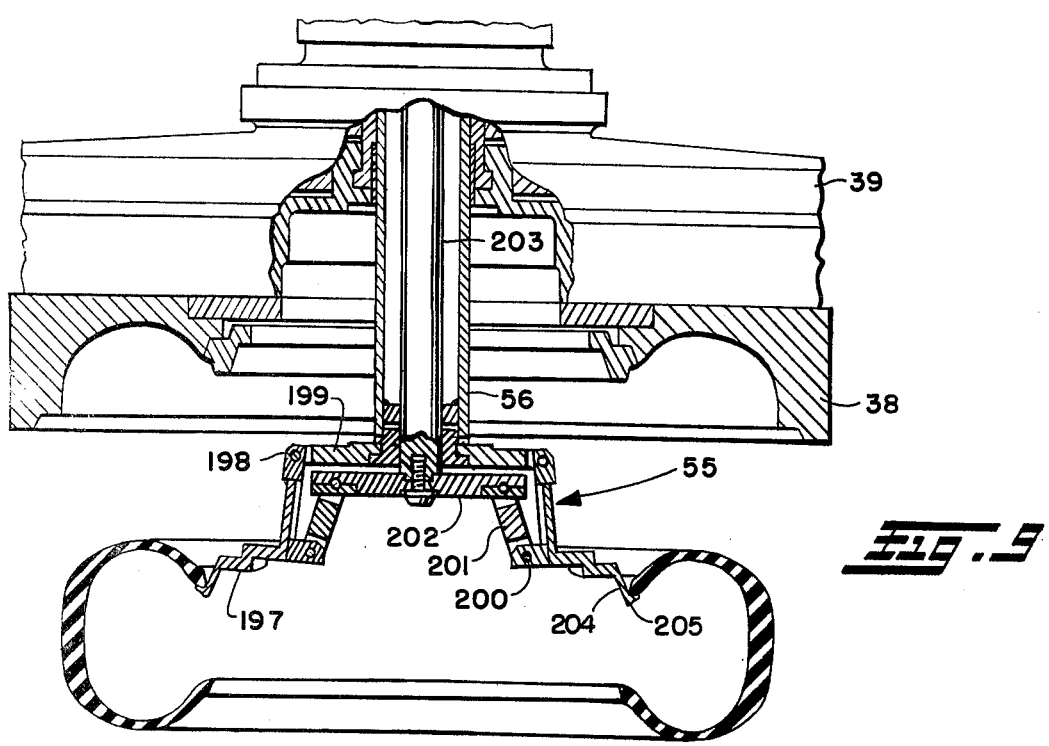

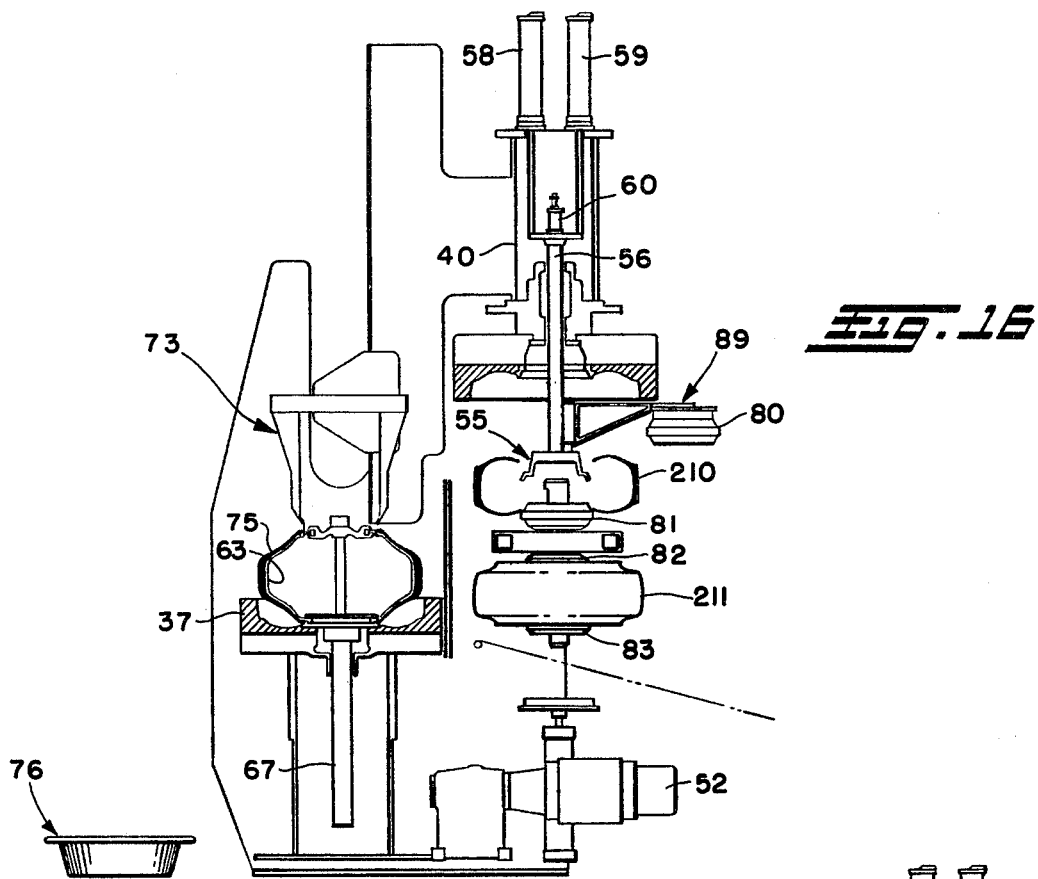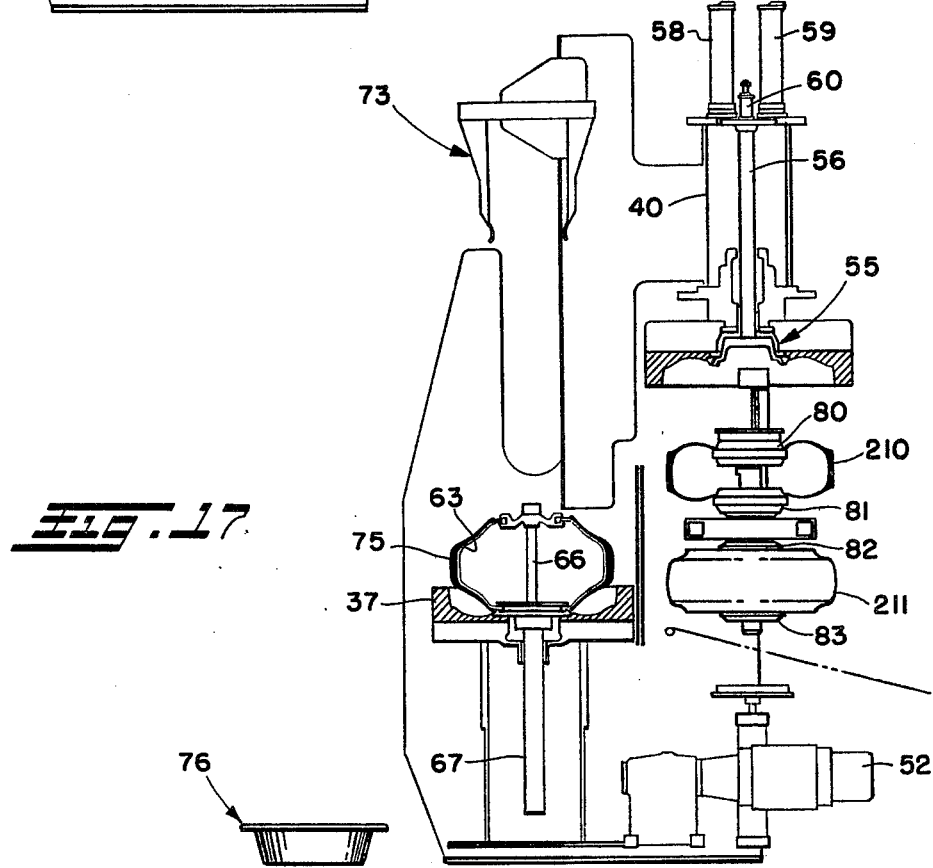

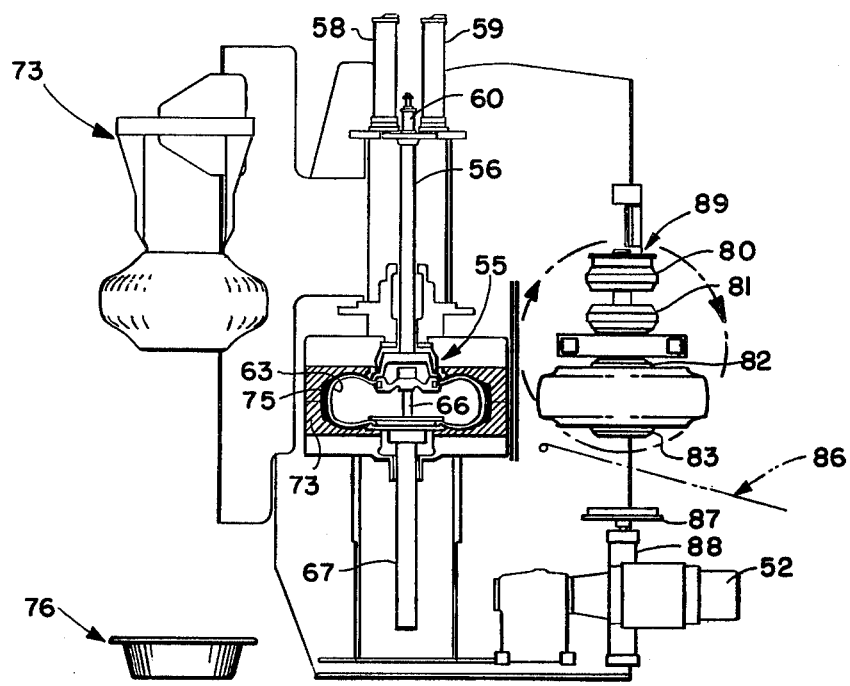
_Fig. 24_
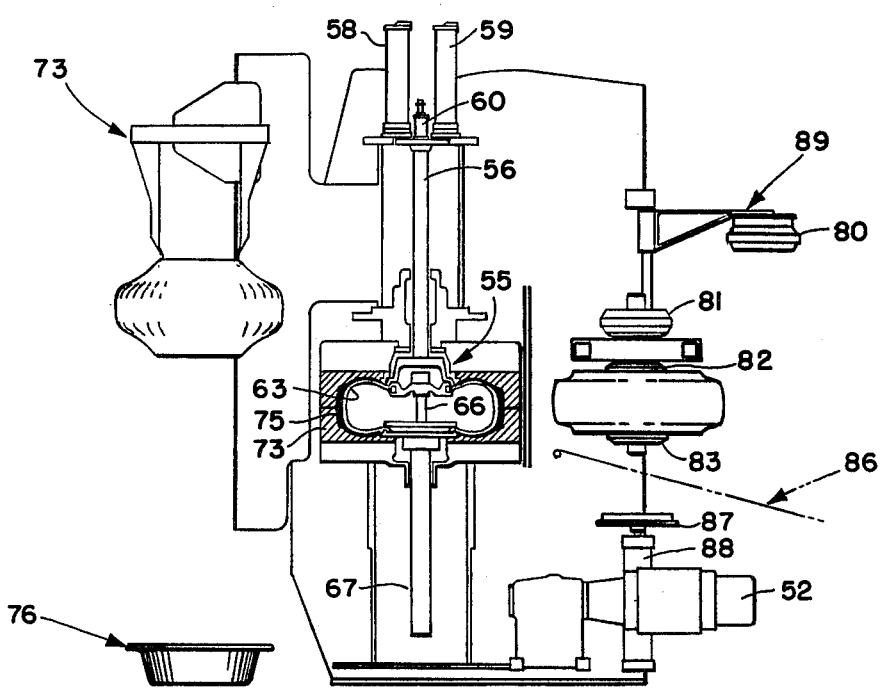
_Fig. 25_

TIRE CURING SYSTEM

This invention relates generally as indicated to a tire curing system and more particularly to a tire curing press and post inflator combined in a single machine wherein the tire is moved through the loading, shaping, curing, and post inflation steps under complete control.

Present day tire curing is accomplished by a tire curing press which shapes and cures the green or uncured tire carcass and then discharges the cured tire usually on an inclined conveyor at the rear of the press. If post cure inflation is employed, it is generally accomplished by a separate machine positioned at the rear of the press. In order to be positioned properly in the post cure inflator, the tire must be restrained or recaught after discharge from the press and properly centered for engagement with the bead engaging rims when the post cure inflator closes. Such restraint and centering devices which engage the outside or tread of the tire are complex and costly, requiring adjustment for different tire sizes. When tires are dropped onto a conveyor, particularly as the result of a stripping or ejecting mechanism imparting a force to the tire, the position the tire may obtain after striking the conveyor can vary widely due to the momentum achieved by the drop or by acceleration down an inclined conveyor, and the inherent resiliency or tendency to bounce in the tire itself. A common complaint about post cure inflators is that the tire restraint or centering devices fail to perform properly. Tires have been known to pass completely through a post cure inflator. Obviously, if the tire is not properly centered, a defective tire will result. Moreover, since the post cure inflator is usually interlocked with the tire curing press, a malfunction in the post curing operation may cause the press to stop.

Attempts have been made to provide greater reliability for post cure inflators. For example, power driven horizontally disposed conveyor belts have been employed to reduce tire momentum as the tire moves into the post cure inflator. While somewhat effective, such belt drives obviously add to the cost of the equipment.

Prior attempts have been made to associate more closely the post cure inflator with the tire curing press. Reference may be had, for example, to U.S. Pat. No. 3,065,499 to Brundage et al for a disclosure of a tire curing press incorporating a post cure inflator therein. In such prior patent, the tire nonetheless was stripped from the upper mold section to drop onto a bottom bead rim of a post cure inflator. Since the tire was stripped from the top toe ring of the mold by an ejector bar, and since the top mold section was not aligned with the post cure inflator bead rim, the chance of the tire discharged from the press being properly caught by the post cure inflator was remote. Another disadvantage of the post cure inflator shown in such patent is that the top bead rim of the post cure inflator was mounted on the top mold section or the press head for movement therewith. Thus, the post cure inflation cycle could not begin until the press was fully closed.

While the press may rather quickly be loaded with the press head then moving back over the uncured tire, the shaping cycle or closing does not commence until the press head starts downwardly. Moreover, the shaping or closing cycle may include several pauses. Accordingly, a significant time lapse may occur between the commencement of the shaping cycle and the complete closing of the press. The term "post cure inflation" is really a misnomer, since the hot tire continues to cure during the inflation and cooling. It is accordingly desirable that the post inflation commence as soon as possible after the press is opened.

Summarizing then the present invention, there is provided a curing system including a curing press and post inflator combination wherein the tire moves through the curing and post inflation process under complete control at all times. At no time is the tire permitted to fall or roll freely. In this manner, the tire is not permitted to achieve any significant lateral or vertical momentum which might cause misalignment or malfunction.

The post cure inflator is mounted between the side frames of the press on a trunnion frame and the rims thereof are aligned with the top mold section of the press in the full open position of the latter. In a two tire post cure inflator, the upper or outside bead rim of the post inflator is removed by a mechanism operating in synchronism with but independently of the press top mold section. In this manner, the post inflator can be closed and operational well prior to the complete closing of the press at the end of the shaping cycle. A chuck in the top mold section not only holds the tire for stripping from the mold sections as the press opens, but also retains control over the tire vertically to place the tire without dropping or any lateral momentum on the aligned open bottom or inner bead rim of the post cure inflator.

To achieve the advantages of the present invention, a unique post cure inflator is provided wherein the top bead rim, after being unlocked, is lifted and moved horizontally to clear the bead rim therebelow for overhead loading. The post cure inflator may be discharged from beneath.

It is accordingly a principal object of the present invention to provide a tire curing press which places the tire directly into the post cure inflator.

Another principal object is the provision of a tire curing system wherein the tire is placed directly in the inflator without any lateral momentum.

Still another principal object is the provision of a tire curing press-post inflator combination wherein the tire is under complete control at all times between curing and post inflation.

Another object is the provision of a simplified and unique post cure inflator not requiring tire restraint or centering devices.

Still another object is the provision of such post cure inflator not requiring tire infeed conveyors.

A yet further oject is the provision of a tire press-post cure inflator wherein the tire is placed directly into the post cure inflator without dropping or lateral momentum.

A still further object is the provision of a four position post cure inflator which is loaded at the top and discharged at the bottom.

It is also an object to provide a press-post inflation system achieving greater reliability in automation, producing fewer defective tires, and achieving maximum equipment efficiency at minimum cost.

These and other objects and advantages of the invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In said annexed drawings:

FIG. 3 is an enlarged vertical section taken substantially from the line 3—3 of FIG. 2 illustrating the distal end of the swinging arm supporting the top or outer rim of the post cure inflator in the open position;

FIG. 4 is a top plan view as taken from the line 4—4 of FIG. 3;

FIG. 5 is a fragmentary view partially broken away and in section taken from the rear of the press illustrating the manner in which the swing arm is mounted on the side plate of the press for both swinging and vertical movement;

FIG. 6 is a top plan view of the swing arm as taken from the line 6—6 of FIG. 5;

FIG. 7 is a fragmentary side elevation of such mechanism as seen from the line 7—7 of FIG. 5;

FIG. 8 is a side elevation of the present invention employed with another type of press not utilizing the conventional cam side plates;

Figure 1:
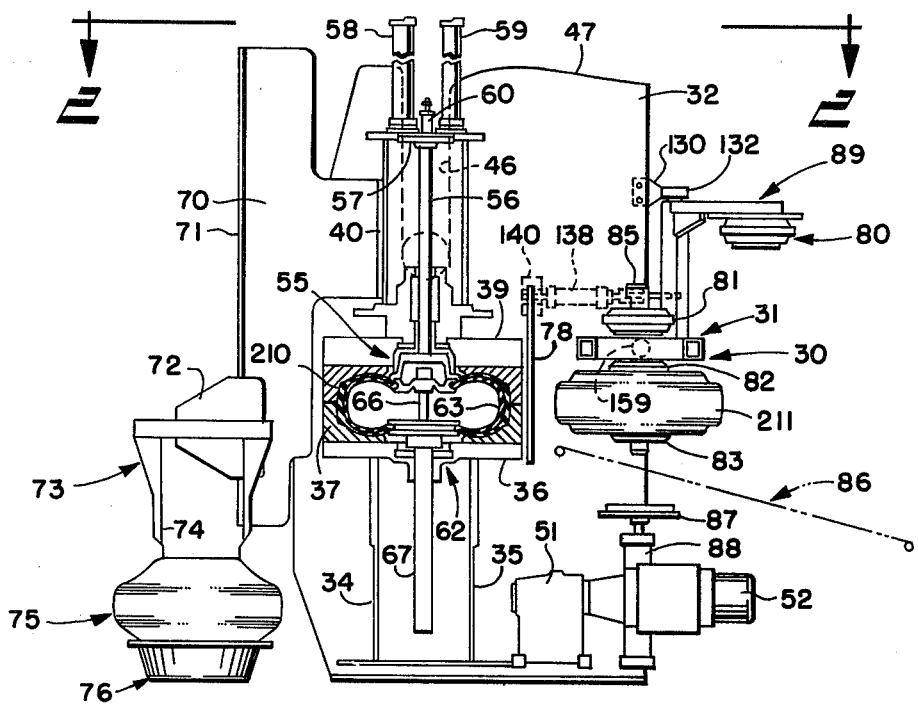
FIG. 1 is a somewhat schematic side elevation, partially in section, illustrating the curing and post inflation apparatus of the tire curing system.

FIG. 9 is a fragmentary view of the upper mold section of the press, whether it be the type of FIG. 1 or FIG. 8, partially in section, illustrating the press fully open and the tire holding chuck utilized with the present invention in an extended tire gripping position; and FIGS. 10 through 25 are somewhat schematic illustrations, similar to FIG. 1, which, together with FIG. 1, illustrate a preferred sequence of operations of the present invention.

Figure 2:
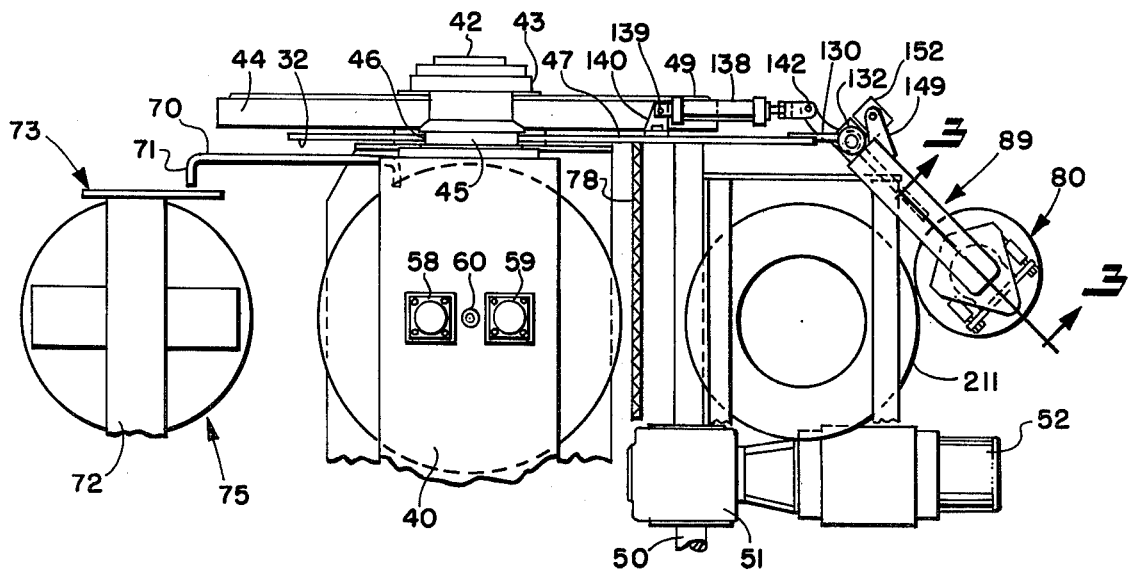
FIG. 2 is an enlarged fragmentary top plan view taken from the line 2—2 of FIG. 1.

Referring first to FIGS. 1 and 2, there is illustrated a tire curing press-post inflator combination, the post inflator being shown generally at 30. Such post inflator is of the flip-over, two tire type capable of holding two tires for post inflation for each cavity of the press. The post inflator comprises a trunnion frame 31 which is journalled between the side plates 32 of the press. The side plates 32 of the press are interconnected by a base frame comprising two parallel spaced vertical plates 34 ad 35 and a top plate 36, the latter supporting stationary bottom mold sections 37.

The movable top mold section 38 is pendently supported from a bolster 39, in turn adjustably secured to the underside of beam or press head 40. Two trunnion pivots 42 project from each end of the press head and are supported and driven by drive links 43 connected between such trunnion pivots and bull gears 44. Each trunnion pivot includes a cam roller 45 which is guided by vertical slot 46 in the side plates and which supports the press head on the top cam surface 47 of the side plates as the press head moves upwardly and to the rear or right as seen in FIG. 1 when the press opens. A further cam slot, not shown, having the same configuration as the cam surfaces 46 and 47 confines a guide roller connected to the press head to maintain the press head against tilting or swinging movement during opening and closing. Reference may be had to the aforementioned Brundage et al U.S. Pat. No. 3,065,499 for a disclosure of such cam slot and the manner in which the press opens and closes.

Each bull gear is driven by a pinion 49 in mesh therewith, such pinions being mounted on the ends of drive shaft 50 driven by transmission 51 through drive motor 52.

The top mold section is provided with a tire holding and stripping chuck shown generally at 55 and seen in greater detail in FIG. 9. The chuck is mounted for vertical movement on the lower end of a vertically movable tubular column 56, the upper end of which is connected to adapter 57 in turn connected to the rods of piston-cylinder assemblies 58 and 59. The chuck is actuated between open and closed positions by relatively small piston-cylinder assembly 60 mounted on the adapter between the piston-cylinder assemblies 58 and 59.

In the center of the bottom mold section, there is provided a bladder shaping mechanism indicated generally at 62. The bladder 63 extends between a lower clamping plate and bead ring 64 and a top clamping plate 65, the latter being mounted on vertically movable post 66. Both the post and thus the top clamping plate, as well as the bottom clamping plate and bead ring, may be moved vertically independently by the depending piston-cylinder assembly shown at 67.

Secured to the press head 40 at each side thereof is a loader frame 70, each of which includes an inturned flange or rail 71 providing a vertical guide for loader frame 72 extending therebetween. For a dual cavity press, as illustrated, the loader frame pendently supports two loading chucks as indicated at 73. The loading chucks include radially movable shoes 74 adapted to grip the green tire 75 interiorly at the upper bead and elevate the same from a positioning device 76 on which the green tires have been placed. A loader of the type which may be employed with the present invention may be seen, for example, in Ulm U.S. Pat. No. 3,267,515.

Conventionally, both the top and bottom mold are provided with circular heat shields. However, because of the proximity of the post cure inflator 30 to the mold sections 37 and 38, an additional heat shield 78 is provided to protect the tires in post cure inflation from the heat generated during the curing of the tire in the press. The heat shield may, if desired, include vertically extending hollow passages for either the forced or convection flow of heated air upwardly.

The arrangement of the loader, bottom mold section and the vertical center line of the post inflator is such that they are horizontally equally spaced. Thus, when the press head moves upwardly and to the rear of the right as seen in FIG. 1 to the full open position, the top mold section 38 will be vertically aligned with and over the center line of the post inflator. Similarly, the loading chuck 73 will be vertically aligned with and over the bottom mold section 37.

The post cure inflator, for each cavity of the press, includes four tire bead engaging rims, such rims being shown at 80, 81, 82 and 83. The two inner bead engaging rims 81 and 82 are secured to the trunnion frame 31. The two outer bead engaging rims 80 and 83 may be selectively locked to the inner bead engaging rims or removed from such inner bead engaging rims when unlocked. The bead engaging rims may be locked together by an axially rotatable lock shaft projecting from each inner bead engaging rim as seen at 85 in FIG. 1. The construction and operation of a preferred lock shaft may be seen in greater detail in the copending application of Joseph M. Martin entitled "Post Cure Inflator," Ser. No. 782,496, filed Mar. 29, 1977 and assigned to the same assignee as the present invention.

The bottom bead engaging rim, when unlocked from the bead engaging rim 82, may be vertically moved through inclined discharge conveyor 86 on elevator 87 actuated by piston-cylinder assembly 88. Again, reference may be had to the copending application of Joseph M. Martin, Ser. No. 782,496 for a disclosure of the construction and operation of an elevator which may be employed with the present invention.

The top bead engaging rim 80, when unlocked from the inner bead engaging rim 81, may be elevated and moved laterally by elevating jib arm 89, the construction and operation of which is shown in greater detail in FIGS. 3 through 7.

It will be appreciated that during operation of the post inflator, when the frame 31 is inverted, the rim 80 will become the bottom rim and the rim 83 will become the top rim, the rims 81 and 82, also inverting.

Referring now to FIGS. 3 and 4, there is illustrated the manner in which the swing and elevating jib arm engages the upper bead engaging rim 80, or 83, as the case may be. The jib arm 89 has secured to the underside of the distal end thereof a plate 90 having the profile configuration seen more clearly in FIG. 4.

Secured to the underside of the plate 90 by the fasteners 91 is a block or receptacle 92. The block has a circular chamfered inner opening 93 or receptacle adapted to receive chamfered circular hub or projection 94 on rim end cap 95. The block 92 includes a diametral transverse key 95 which extends across the opening 93 and engages within a slot or keyway 96 in the hub projection 94. The key and keyway are chamfered as indicated at 97 so that any slight misalignment will be corrected as the parts engage and when engaged, relative rotation will be precluded.

The block 92 is provided with two chordal bores seen at 98 and 99 which symmetrically intersect the chamfered hole 93. The projection 94 is also provided with two chordal circular slots seen at 101 and 102 which form continuations of the bores 98 and 99 when the hub is properly seated and centered in the block 92. The bores extend parallel to the key 95. Slidably mounted in such bores are lock pins 103 and 104 which are secured to yoke plate 105 by the fasteners seen at 106 and 107. Such plate is provided with a slide collar 108 at its center slidable on guide rod 109 extending between the block 92 and bracket 110 depending from the plate 90. Movement of the yoke 105 is obtained by piston-cylinder assemblies 111 and 112. The blind ends of each such piston-cylinder assembly are pivotally connected at 113 to brackets 114 secured to the underside of plate 90. The rods of such piston-cylinder assemblies are connected to the opposite ends of the yoke plate as seen at 115. Thus, extension of the piston-cylinder assemblies will move the plate to the dotted line position seen at 116 pulling the lock pins 103 and 104 clear of the hub projection 94. In this manner, the hub projection and the jib arm may be separated. When the lock pins are in engagement, the hub projection and the jib arm are secured together for movement in unison.

The hub 95 is connected to externally threaded, cylindrical housing 120 by the fasteners indicated at 121. An internally threaded rim support 122 is threadedly connected to the housing 120 and tire bead engaging rim 80 is secured thereto by the fasteners 123. The threaded connection between the housing parts 120 and 122 permits the rim 80 to be adjusted with respect to the lock surface 124 for the lock shaft 85 so that the extent of bead separation during inflation can be controlled. Each bead engaging rim comprises a tire bead engaging flange 125 and a series of inclined pilot teeth 126 which intermesh with similar pilot teeth on the opposite rim so that the flanges 125 on opposite rims may be brought substantially adjacent each other for inflation of the tire.

Referring now to FIGS. 5, 6 and 7, there is illustrated one form of mounting the jib arm for both swinging and vertical movement. Secured to the edge of the side plate 32 are two vertically spaced brackets 130 and 131 as seen in FIG. 7 each of which supports horizontally extending vertically aligned hubs 132 and 133, respectively, in which are journalled the dowel ends of square shaft 134. Both radial and thrust bearings may be employed at each end of the shaft as seen at 135 and 136, respectively.

In order to oscillate the shaft 134 about its vertical axis, there is provided a piston-cylinder assembly 138, the blind end of which is pivoted at 139 to bracket 140 secured to the exterior of the plate 32. The rod 141 is pivotally connected at 142 to the end of L-shape crank arm 143 which is in turn secured to the shaft 134. Thus, extension and retraction of the piston-cylinder assembly 138 will cause the shaft 134 to oscillate about its vertical axis.

The proximal end of the jib arm 89 is provided with a vertically extending channel as indicated at 145. Such channel, also secured to the arm 89, interconnects vertically spaced bushing slide blocks 146 and 147 which are slidably mounted on the shaft 134. The arm 89 is provided with an offset 149 to the underside of which is pivotally connected at 150 the rod 151 of piston-cylinder assembly 152. The blind end of such assembly is pivoted at 153 to plate 154 secured to and projecting horizontally from the shaft 134. In this manner, extension of the piston-cylinder assembly as shown in FIGS. 5 and 7 will cause the arm 89 to elevate to the position shown, and retraction will cause the arm to lower along the shaft 134. The piston-cylinder assemblies 152 and 138 will, of course, be interlocked so that the arm 89 may swing only in its uppermost position. If desired, a gusset 155 may be provided between the arm 89 and the channel 145.

As seen in FIG. 5, the trunnion frame 31 includes piston-cylinder assemblies 156 and 157 operative to rotate the lock shaft 85 and the lock shaft 158 projecting through the inner bead register rims 81 and 82 as indicated. Projecting from the ends of the frame 31 are trunnion shafts 159 which extend through slots 160 in the side plates and are journalled in bearings 161 supported thereon. A suitable motor and drive for rotating or oscillating the frame 131 is mounted on shaft 152 as seen at 162, supported on side plate 32 by spring stabilizer 163.

Referring now to FIG. 8, there is illustrated another form of tire curing press incorporating a self-contained post cure inflator in accordance with the present invention. The press comprises a base frame 165 supported on legs 166 and 167 within a pit 168. This brings the base frame 165 to approximately the same elevation as the floor 169. The base frame 165 supports the bottom mold section surrounded by rotatable lock ring and heat shield 170.

Extending from the base frame 165 is a vertical column 171 at each side of the front of the press and a diagonally extending rear column 172, at each side at the rear of the press. The vertical and diagonal columns at each side of the press are each joined at the top by horizontally extending rail 173. The side frames of the press are thus formed by the vertical and diagonal columns 171 and 172 with the rail 173 interconnecting the same. There are no transverse frame members extending between the columns and rails at each side of the press.

The parallel laterally spaced rails 173 support a frame 175 which is mounted thereon by the rollers 176 and 177, two such rollers supporting the frame on each rail. The frame includes an elevator column 179, the lower end of which is connected to platen 180 supporting the top mold section on the under side thereof.

When the mold sections are unlocked, the column 179 elevates lifting the top mold section. The carriage then traverses to the phantom line position seen at 182 wherein the top mold section is then in alignment with the post cure inflator 30. The chuck 55 in the upper mold section extends through the action of piston-cylinder assembly 183 depositing the tire on the cleared inner bead rim 81. Simultaneously, loader chuck 184 which is supported on the rod 185 of piston-cylinder assembly 186 is depositing the green tire 187 on the bottom mold section as seen by the phantom line position 190. The piston-cylinder assembly 186 is supported in cantilever fashion from the rolling frame 175 by the arm 191.

The post cure inflator 30 is journalled between the diagonal frames 172 as indicated at 192 and is driven for oscillation. An elevator 193 is provided for lowering the bottom bead rim below inclined discharge conveyor 194 and the swinging jib arm 89 is provided for clearing the top bead rim and lowering the same. Reference may be had to the copending application of Armindo Cantarutti entitled "Vulcanizer Lock Means," Ser. No. 629,504, filed Nov. 6, 1975, now U.S. Pat. No. 4,025,251, for a more clear disclosure of the construction and operation of a press of the type seen in FIG. 8.

Again, in addition to the rotatable shield and locking ring 170, an additional heat shield 195 is provided between the molds in the curing position and the post cure inflator.

Referring now to FIG. 9, it will be seen that the chuck 55 includes a plurality of pivotally mounted segments 197 of generally L-shape configuration which are pivoted at the top of the L at 198 to spider 199 which is secured to the vertically movable column 56. Each chuck segment includes an inwardly extending pivot connection 200 connected by link 201 to chuck actuator 202 which is vertically movable against an adjustable stop through chuck actuating rod 203. Vertical movement of the chuck actuating rod causes the segments to pivot about the pivots 198 from the open to the closed position of the chuck, and vice versa. The chuck segments each include a conical pilot portion 204 and a foot or shelf 205 which fits beneath the top bead of the tire. The conical pilot portion engages the I.D. of the bead centering the same and precluding any lateral movement of the tire with respect to the chuck. For a more detailed disclosure of the construction and operation of a chuck which may be employed, reference may be had to the copending application of Armindo Cantarutti entitled "Tire Curing Press," Ser. No. 720,192, filed Sept. 3, 1976.

OPERATION

Referring now to FIGS. 1 and 10-25 in that order, there is illustrated a preferred sequence of operations for the present invention.

With reference to FIG. 1, the press is illustrated closed with the tire 210 in the cure position. The loader 73 is down for pickup of the green tire 75. The post cure inflator has the top bead rim 80 removed and laterally offset ready to receive the cured tire 210. A tire 211 continues to cool in the post cure inflator.

Figure 10:
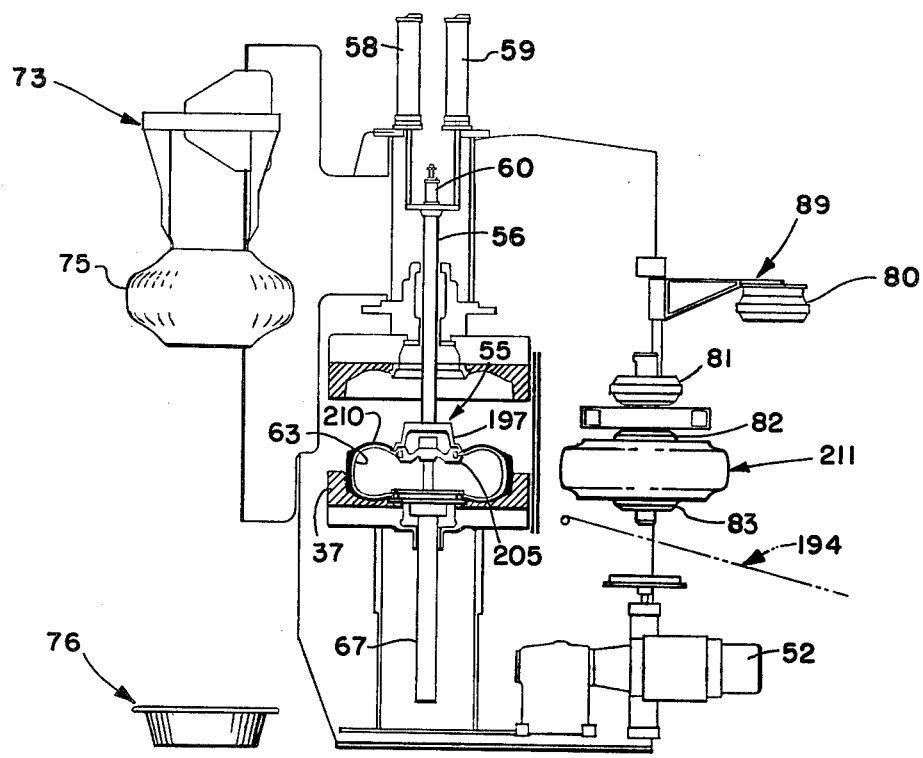

Referring now to FIG. 10, the loader chuck 73 has moved upwardly holding the green tire 75 elevating the same from the stand 76. With the cure complete, the press now begins to open. The chuck sectors 197 extend by the action of the piston cylinder assembly 60 causing the portions 205 of the sectors to move beneath the cured tire top bead moving the bladder away from the tire. Continued upward movement of the mold section strips the cured tire from the top mold half. As the upper mold half opens, the column 56 moves downwardly maintaining the chuck in its down position. The post cure inflator remains ready to receive the cured tire with the tire 211 still cooling therein.

Figure 11:
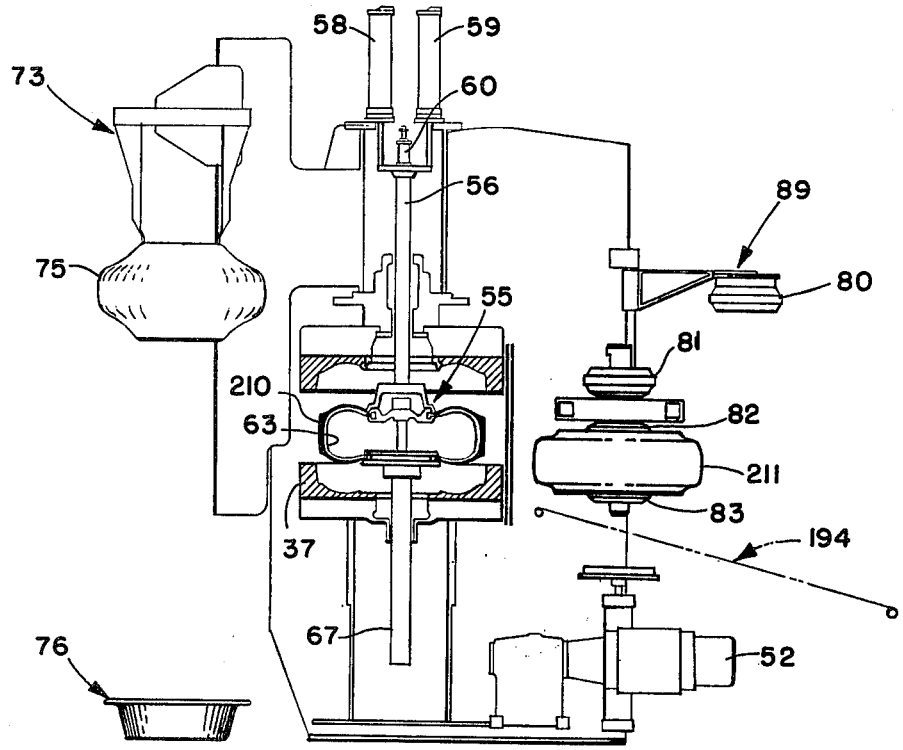

As seen now in FIG. 11, the press continues opening and the lower bead lift now moves upwardly forcing the chuck upwardly against any pressure in the piston-cylinder assemblies 58 and 59. The movement of the bladder assembly and the upward movement of the lower bead ring strips the tire from the lower mold half. The chuck sectors, however, continue to hold the cured tire. The post cure inflator remains ready to receive the cured tire and the tire 211 continues cooling in the post cure inflator.

Figure 12:
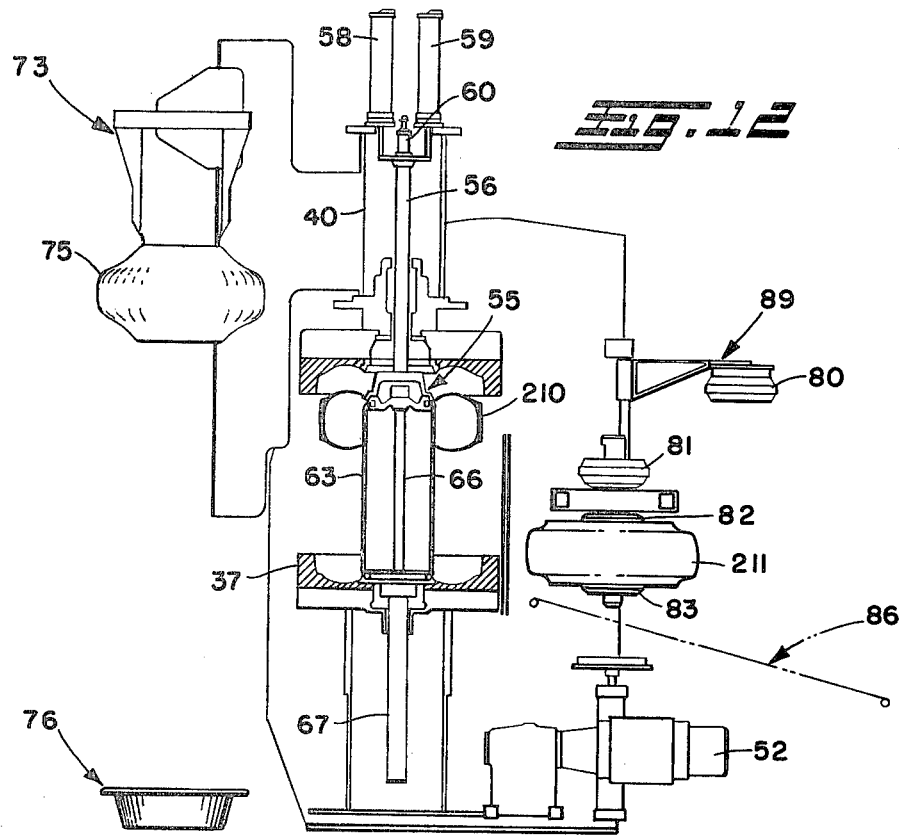

Referring now to FIG. 12, the press continues to open further. The post 66 now moves upwardly as the bottom clamp ring and bead ring move downwardly stripping the bladder 63 from the cured tire 210. The chuck sectors continue holding the tire. The post cure inflator remains ready to receive the cured tire and the tire 211 continues cooling therein.

Figure 13:
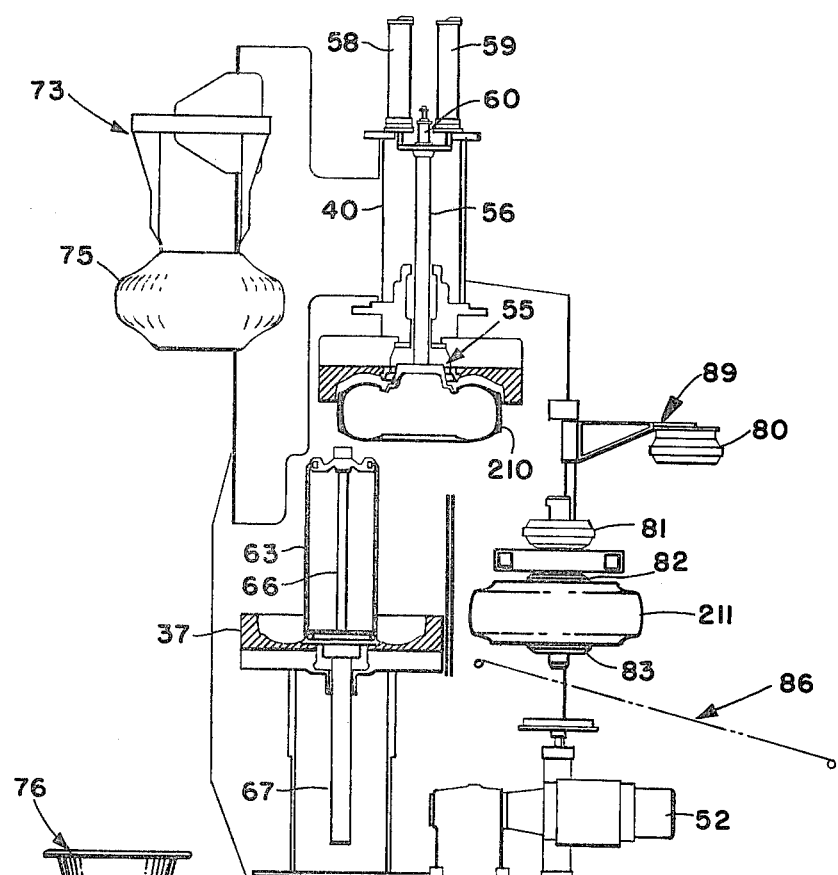

As seen in FIG. 13, the press continues to open and the chuck retracts into the top mold section lifting the tire over the post and bladder. When the chuck has moved up to a clearance position for the tire, the press head now starts its rearward movement. The tire is then carried over the post and bladder by the press beam 40. At the same time, the loader is moving into the mold loading position by the action of the press beam. The post cure inflator remains ready to receive the cured tire with the tire 211 still cooling therein.

Figure 14:
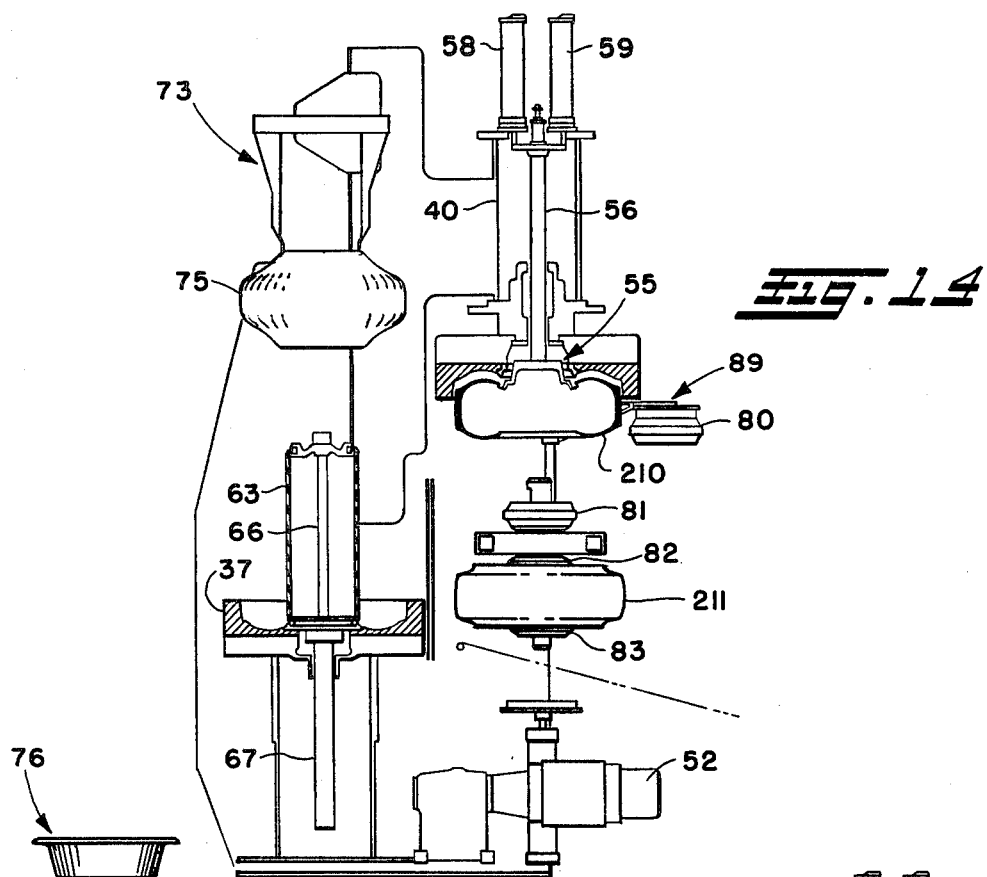

Referring now to FIG. 14, the press has moved to its full open position and the cured tire 210 is centered over the post cure inflator. At the same time, the loader is centered over the post and bottom mold section. The post cure inflator remains ready to receive the cured tire and the tire 211 continues in its cooling position.

Figure 15:
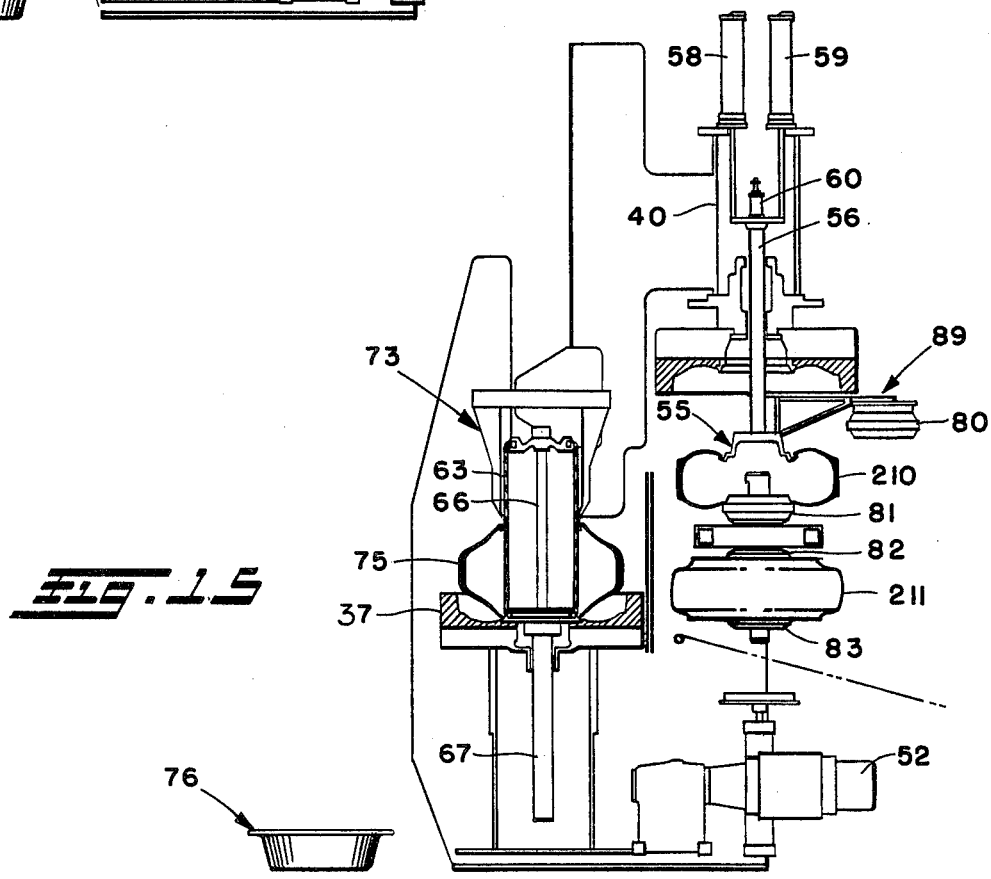

Referring now to FIG. 15, the chuck 55 is lowered to load the cured tire 210 directly on the exposed inner post cure inflator register rim 81. This movement is obtained by extension of the piston-cylinder assemblies 58 and 59. A slight amount of overtravel moves the chuck segments beneath the top bead of the tire 210 and retraction of the piston-cylinder assembly 60 closes the chuck. At the same time, the loader is lowered to load the green tire 75 on the bottom bead ring of the lower mold 37. Tire 211 continues to cool in the post cure inflator.

Moving on now to FIG. 16, with the cured tire 210 centered on the post cure inflator register rim 81 and the chuck closed, retraction of the piston-cylinder assemblies 58 and 59 clears the top bead of the tire. Tire 211 continues cooling in the post cure inflator.

In FIG. 17, the chuck has withdrawn into its fully retracted position in the upper mold section, and the post cure inflator upper register rim 80 swings over and then moves down toward the locked position on the post cure inflator. While the loader continues to hold the green tire 75, the bladder post is pulled down and preinflation of the tire commences. Tire 211 continues to cool in the post cure inflator. In FIG. 17, the jib arm and top bead register rim 80 are not fully down, but it is noted that the top rim 80 has moved independently of the top mold section. In this manner, the tire 210 can be locked for post cure inflation before the top mold section has moved to its FIG. 18 position.

Figure 18:
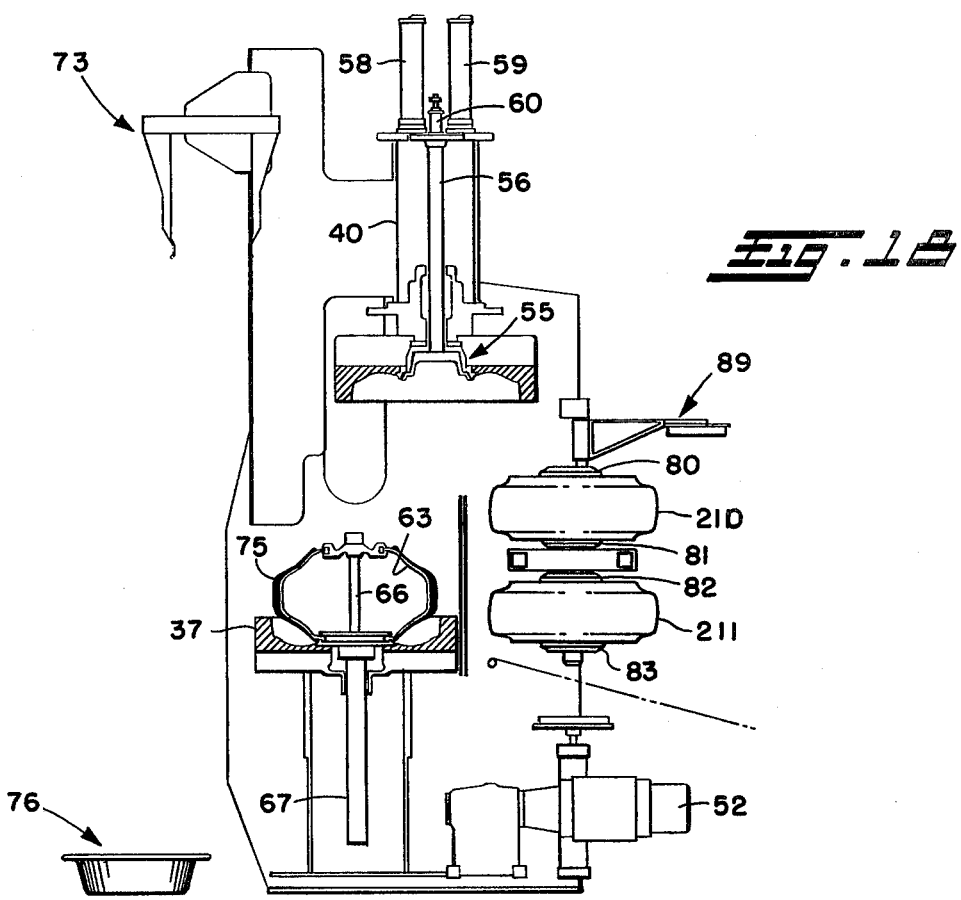

Referring now to FIG. 18, the loader has released the green tire 75 moving upwardly, and as the press beam moves forwardly, the loader and press head are moving to their respective positions over the loading stand 76 and the bottom mold section 37. At this time, the post cure inflator is locked up and the tire 210 is inflated. The jib arm 89 has released the top rim and has swung clear of the post cure inflator.

Figure 19:
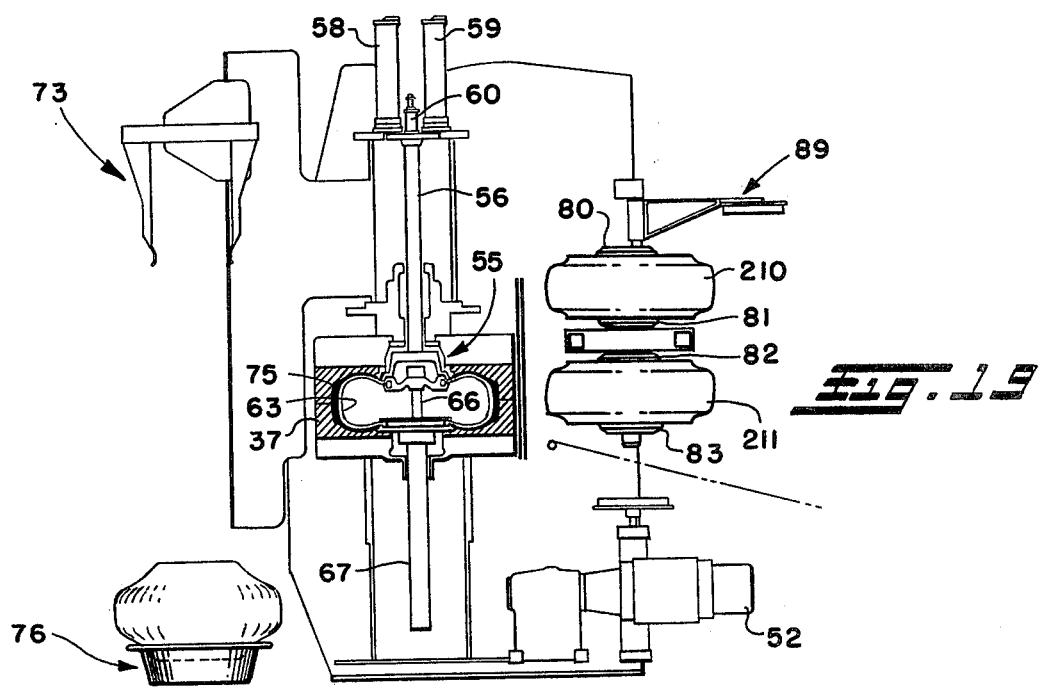

Referring now to FIG. 19, the press is fully closed and the tire 75 is now shaped and being cured in the press. The loader is now centered over the stand 76 ready to pick up the next green tire which has been positioned by an operator in the stand 76. Both tires are now cooling in the post cure inflator.

Figure 20:
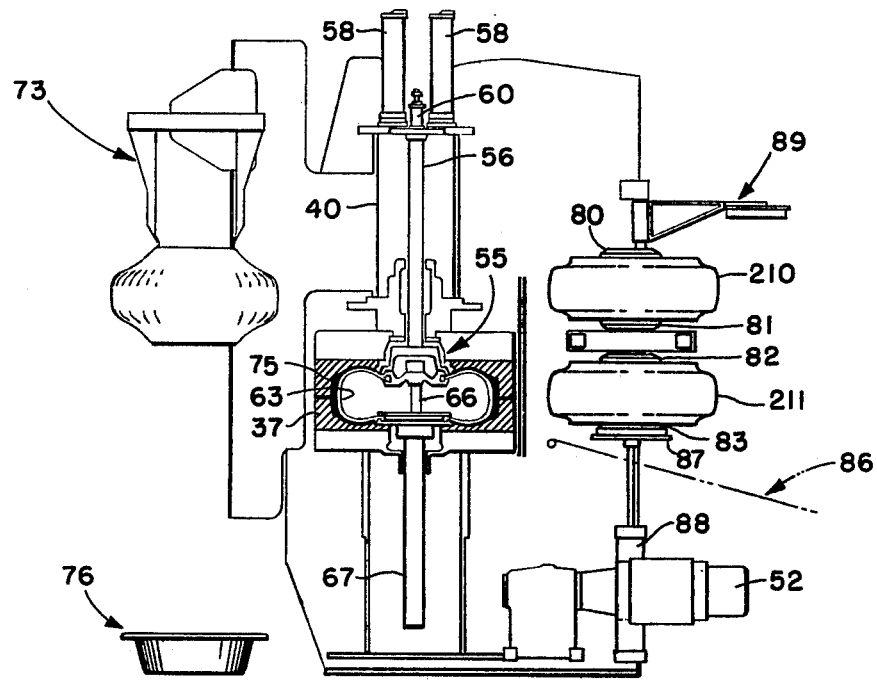
Figure 21:
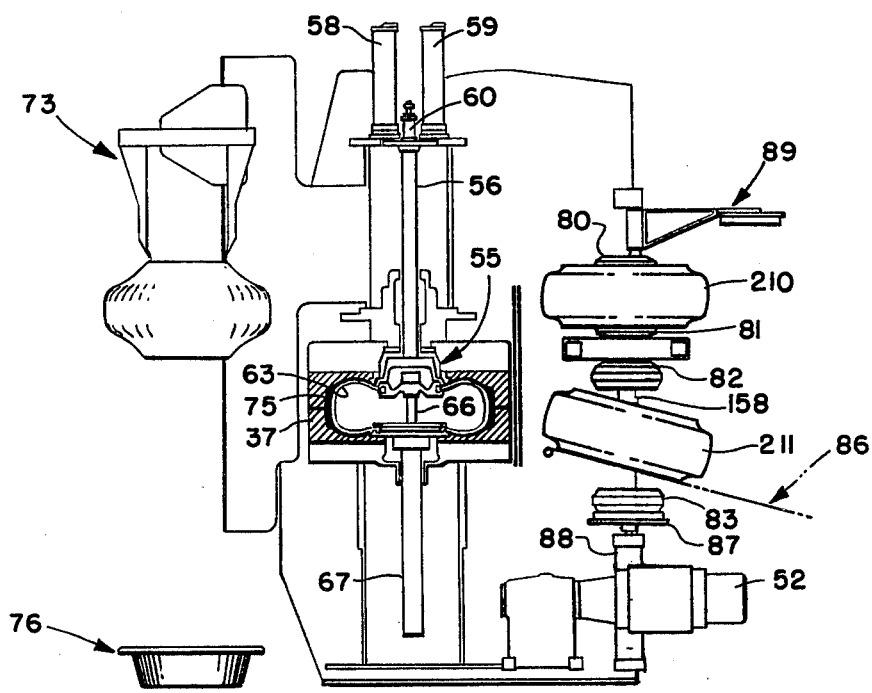

Referring now to FIG. 20, while the press is closed and the tire 75 is curing, the loader has picked up the next green tire. The elevator cylinder 88 has extended moving the elevator 87 upwardly to engage the PCI rim 83 after the tire 211 has been deflated. When the rim 83 is unlocked, the elevator with the rim thereon moves downwardly placing the tire 211 on the discharge conveyor 86 as seen in FIG. 21.

Figure 22:
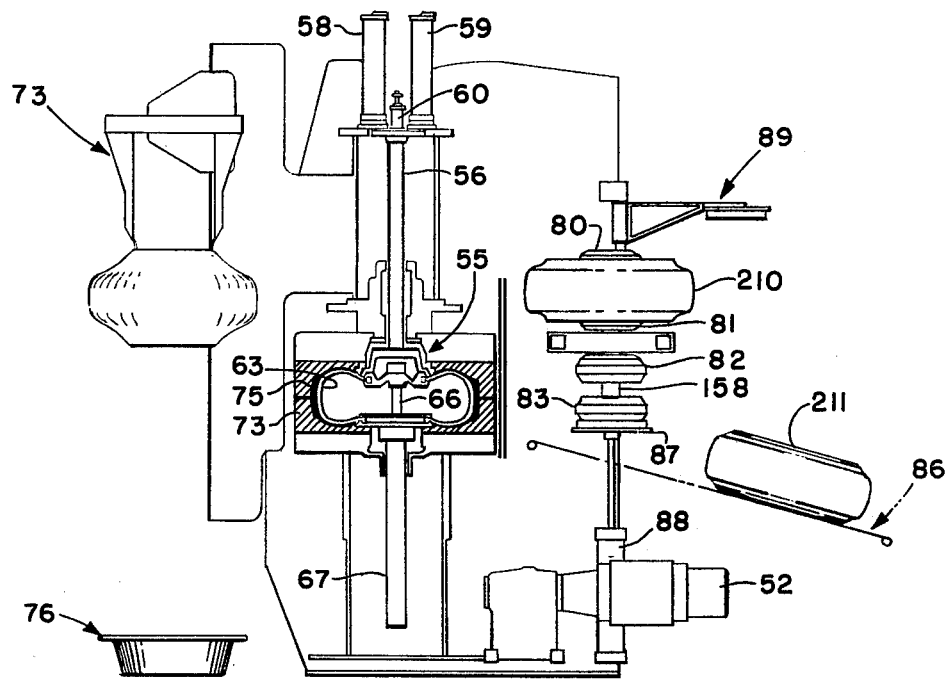

Referring now to FIG. 22, the press continues closed with the tire 75 curing. With the tire 211 clear of the post cure inflator, the elevator 87 moves upwardly to reposition the bottom rim 83 to be secured to the post cure inflator by the lock shaft 158.

Figure 23:
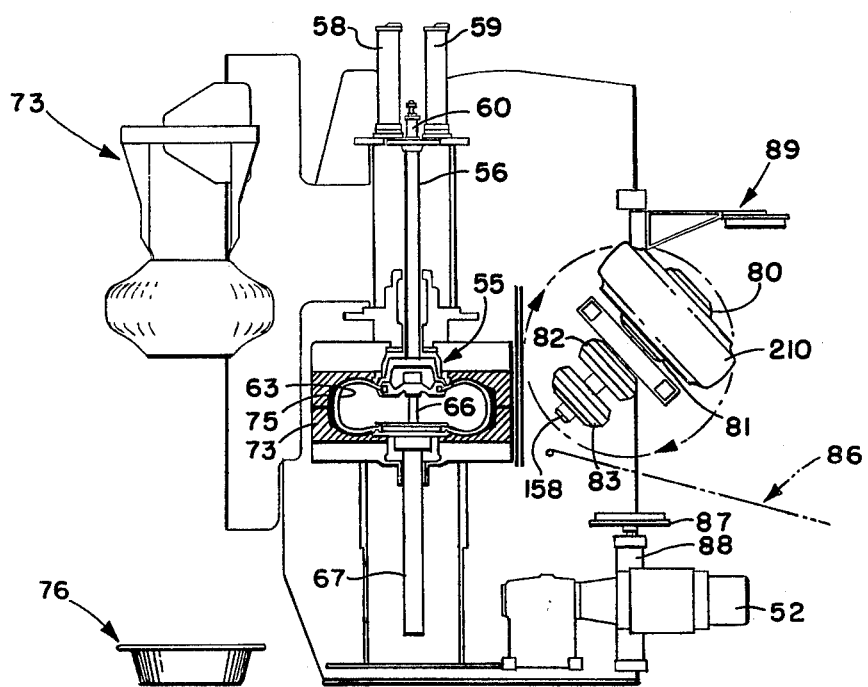

Referring now to FIG. 23, while the press is closed and the tire 75 continues curing, the elevator cylinder moves downwardly to permit the post cure inflator to rotate 180° to its alternate inverted load position. Tire 210 now moves to the bottom cooling position.

With reference to FIG. 24, the press is closed and the tire 75 continues curing. The post cure inflator stops rotation in its horizontal position. The jib arm swings over the rim 83, moves downwardly to engage the same, and when unlocked, lifts the same and swings it clear of the post cure inflator. The post cure inflator is now ready for the next cured tire to be loaded therein.

It will be appreciated that the post cure inflator may move through the discharge and inversion cycles seen in FIGS. 20 through 25 shortly before the press is ready to open. While the press will open at the end of a time cycle, an interlock will be provided so that it cannot open prior to the clearance of the post cure inflator for the overhead loading shown.

There are, of course, other modes of operating the apparatus described. For example, the post cure inflator may be provided with an intermediate cooling position wherein both tires are held in a vertical plane for cooling, alternately swinging to the load and discharge positions.

In any event, there is provided a tire curing system wherein the tire cured in the press is loaded directly into the post cure inflator without having to be released and then recaught.

I claim:

1. A tire curing system comprising a press and a separable rim post inflator, said press including a bottom and movable top mold, the latter being movable laterally between said bottom mold and at least one of said separable rims of said post inflator, a stripping chuck in said top mold for holding the tire after stripping from the molds for movement with the movable top mold, and means to lower said chuck while holding the tire when the movable top mold and post inflator rim are vertically aligned to place the tire in the post inflator without any lateral momentum.

2. A tire curing system as set forth in claim 1 wherein said post inflator comprises vertically separable bead engaging rims, and means to lift the uppermost rim and move the same laterally to expose the other rim for placement of the tire thereon.

3. A tire curing system as set forth in claim 2 wherein said means to lift and move the uppermost rim comprises a vertically movable swinging jib arm.

4. A tire curing system as set forth in claim 3 wherein said press includes side frames supporting said top mold for movement, said jib arm being mounted on the interior of said side frames.

5. A tire curing system as set forth in claim 4 wherein said post inflator is of the flip-over type and includes a trunnion frame, said trunnion frame being journalled between said side frames.

6. A tire curing system as set forth in claim 4 wherein said jib arm is mounted on and keyed to pivot with a vertically extending pivot shaft journalled top and bottom on a side frame.

7. A tire curing system as set forth in claim 6 wherein said jib arm is vertically movable on said pivot shaft.

8. A tire curing system as set forth in claim 7 including an elevator piston-cylinder assembly having one end connected to said jib arm and the other end connected to said pivot shaft operative to raise and lower said jib arm on said pivot shaft.

9. A tire curing system as set forth in claim 8 including a swing piston-cylinder assembly having one end connected to said pivot shaft and the other end connected to a side frame operative to swing said pivot shaft and thus said jib arm.

10. A tire curing system as set forth in claim 2 wherein said means to lift and move said uppermost rim includes a depending chuck operative to engage and secure said uppermost rim for such lifting and movement.

11. A tire curing system as set forth in claim 10 wherein said chuck includes an axial alignment key and at least one horizontally movable lock pin.

12. A tire curing system as set forth in claim 3 including a depending chuck on the distal end of said jib arm operative to engage and secure the uppermost rim for such lifting and movement.

13. A tire curing system as set forth in claim 12 wherein said chuck includes an axial alignment key and at least one horizontally movable lock pin.

14. A tire curing system as set forth in claim 2 wherein said means to move the uppermost rim laterally vertically clears the movable top mold in the full open position of the press whereby when said chuck is retracted into said top mold, the uppermost rim may be replaced without movement of the top mold.

15. A tire curing system for the curing of tires comprising a press and post cure inflator combination in side-by-side relationship, said press including a movable top mold section movable when the press opens to a position above said post cure inflator, a tire chuck in said movable top mold section maintaining the tire centered, and means to lower said chuck to place the tire directly in the post cure inflator without any lateral momentum.

16. A tire curing system as set forth in claim 15 wherein said post cure inflator comprises vertically separable bead engaging rims, and means to lift the uppermost rim and move the same laterally to expose the other rim for placement of the tire thereon.

17. A tire curing system as set forth in claim 16 wherein said chuck, after releasing the tire in the post cure inflator is fully retractable into said movable top mold section.

18. A tire curing system as set forth in claim 17 wherein said means to move the uppermost rim laterally vertically clears the movable top mold section in the full open position of the press whereby when said chuck is fully retracted, the uppermost rim may be replaced to commence inflation of the tire without movement of the movable top mold section.

19. A tire curing system as set forth in claim 15 including side frames supporting the movable top mold section for such movement, said post cure inflator being of the flip-over type, including a trunnion frame, said frame being journalled between said side frames.

20. A tire curing system as set forth in claim 19 including four tire inflating rims for each mold cavity of the press, means to release and lower the lowermost rim to dischrage a post inflated tire, and means to release, lift and move laterally the uppermost rim for loading of said post cure inflator.

21. A tire curing press having a top mold section movable laterally fully to open the press, a tire unloading chuck in said top mold section adapted to maintain the tire centered with respect to the top mold section, a post inflator ring vertically aligned with the top mold section when fully open, and means to move the chuck thus centering the tire downwardly when the press is fully open to place the tire on such ring without any lateral momentum of the tire.

22. A tire curing press as set forth in claim 21 wherein said ring is one of a pair which are vertically separable and relatively horizontally movable when separated.

23. A tire curing press as set forth in claim 21 wherein said chuck includes a conical centering portion for the I.D. of the upper bead of the tire.

24. A tire curing press as set forth in claim 21 wherein said ring is one of a pair, means vertically to separate and relatively horizontally to move said rings independently of the position of said top mold section.

25. A post cure inflator comprising an upper and lower rim, lock means operative to lock said rims together to inflate a tire therebetween and to unlock said rims to permit separation for insertion and removal of the tire therebetween, means vertically to move one of said rims when unlocked and then move said rims relatively horizontally to to offset said rims to clear the lower of said rims for overhead loading of a tire to be inflated, and means alignable with the lower rim operative to load a tire on said lower rim while said rims are held horizontally offset.

26. A post inflator as set forth in claim 25 wherein said one of said rims is the upper rim, the tire being loaded on the lower rim.

27. A post inflator as set forth in claim 26 wherein said means vertically to move said upper rim comprises a vertically movable swing jib arm.

28. A post inflator as set forth in claim 27 wherein said jib arm is mounted on and keyed to pivot with a vertically extending pivot shaft.

29. A post inflator as set forth in claim 27 including a chuck on the distal end of said jib arm operative to engage and grip said upper rim for vertical and horizontal movement.

* * * * *